(12) United States Patent
Divinity et al.

(10) Patent No.: US 9,408,447 B1
(45) Date of Patent: Aug. 9, 2016

(54) GAME CONTROLLER TRAVEL CASE

(71) Applicants: Lewis J. Divinity, Los Angeles, CA (US); De Andre Divinity, Los Angeles, CA (US)

(72) Inventors: Lewis J. Divinity, Los Angeles, CA (US); De Andre Divinity, Los Angeles, CA (US)

( * ) Notice: Subject to any disclaimer, the term of this patent is extended or adjusted under 35 U.S.C. 154(b) by 0 days.

(21) Appl. No.: 14/660,008

(22) Filed: Mar. 17, 2015

(51) Int. Cl.
| | |
|---|---|
| B65D 85/38 | (2006.01) |
| A45C 13/02 | (2006.01) |
| A45C 11/00 | (2006.01) |
| A45C 13/36 | (2006.01) |
| A63F 13/98 | (2014.01) |

(52) U.S. Cl.
CPC ............... *A45C 13/02* (2013.01); *A45C 11/00* (2013.01); *A45C 13/36* (2013.01); *A63F 13/98* (2014.09)

(58) Field of Classification Search
CPC .. A45C 11/00; A45C 2011/003; A45C 13/02; A45C 13/36; B65D 81/113; B65D 81/107; B65D 81/509; B65D 5/509; A63F 13/98
USPC ......... 206/305, 314, 14, 316, 316.2, 0.1, 317, 206/523, 586
See application file for complete search history.

(56) References Cited

U.S. PATENT DOCUMENTS

| | | | | |
|---|---|---|---|---|
| 4,093,010 | A * | 6/1978 | Hunley | A45C 13/02 206/316.2 |
| 4,106,597 | A * | 8/1978 | Shook | A45C 13/02 190/110 |
| 4,446,900 | A * | 5/1984 | Markovich | A45C 13/02 206/317 |
| 5,002,184 | A | 3/1991 | Lloyd | |
| 5,316,178 | A * | 5/1994 | Garber, Jr. | A23B 7/152 206/523 |
| 5,607,054 | A | 3/1997 | Hollingsworth | |
| 5,632,373 | A | 5/1997 | Kumar et al. | |
| 6,029,804 | A * | 2/2000 | Flynn | G10G 7/005 206/14 |
| 6,446,809 | B2 * | 9/2002 | Flynn | A45C 5/02 190/125 |
| 6,601,680 | B2 * | 8/2003 | Japchen | A45C 13/18 190/101 |
| 7,104,398 | B1 * | 9/2006 | Wisecarver | G02B 23/12 206/316.3 |
| 7,775,365 | B1 * | 8/2010 | More | A61F 2/76 206/523 |
| 8,104,615 | B2 * | 1/2012 | Liu | B25H 3/003 206/373 |
| 8,522,964 | B1 * | 9/2013 | Pledger | A47F 7/03 206/523 |
| 2007/0053948 | A1 * | 3/2007 | Ammon | A61L 12/086 424/405 |
| 2007/0138041 | A1 * | 6/2007 | Welsh | A45C 13/36 206/349 |
| 2008/0093251 | A1 * | 4/2008 | Meyer | B65D 81/022 206/523 |
| 2008/0237939 | A1 * | 10/2008 | McDonnough | A45C 13/02 264/500 |
| 2010/0089918 | A1 * | 4/2010 | Logan | B65D 81/107 220/62.15 |
| 2011/0089072 | A1 * | 4/2011 | Gillam | B65D 81/113 206/526 |
| 2013/0047533 | A1 * | 2/2013 | Diener | E04F 19/0486 52/288.1 |

* cited by examiner

*Primary Examiner* — Jacob K Ackun
*Assistant Examiner* — Rafael Ortiz
(74) *Attorney, Agent, or Firm* — Crossley & Stevenson Intellectual Property Law

(57) ABSTRACT

A game controller travel case including a base and a lid; interior and internal padding continuously disposed in the respective base and lid; and a padded recess disposed within the interior padding. The recess has first and second portions. The first portion has a cavity within the interior padding and a biconcave center section with mirror image kidney-shaped side sections on each side thereof. The second portion has two rectangular parallel first sides and second sides perpendicular thereto. A third portion of the recess is disposed between the first portion and the second portion. The first and second portions are configured to securely retain a home video game controller and wireless port, respectively, therein. A slot configured to retain a memory card therein is also disposed in the base. Steel corners are on the base and the lid. A latch mechanism, handle, and footing members are also provided.

1 Claim, 4 Drawing Sheets

GAME CONTROLLER TRAVEL CASE

BACKGROUND OF THE INVENTION

Various types of travel cases for computers and computer accessories are known in the prior art. However, what is needed is a game controller travel case having padding in the base and in the lid with recesses in the base padding to secure a home video game controller, a memory card, and a wireless port therein.

FIELD OF THE INVENTION

The present invention relates to travel cases, and more particularly, to a game controller travel case.

SUMMARY OF THE INVENTION

The general purpose of the present game controller travel case, described subsequently in greater detail, is to provide a game controller travel case which has many novel features that result in a game controller travel case which is not anticipated, rendered obvious, suggested, or even implied by prior art, either alone or in combination thereof.

To accomplish this, the present game controller travel case is configured to store a home video game controller. The game controller travel case includes a base and a lid hingedly attached thereto. An interior padding is continuously disposed between front, rear, left and right walls and a bottom side of the base. A padded recess is disposed within the interior padding between the upper side thereof and the bottom side of the base. A first portion of the recess has an upper ledge and a cavity continuously disposed within the interior padding between a lower wall of the upper ledge and the bottom side of the base. The first portion has a horizontally disposed biconcave center section with mirror image substantially kidney-shaped side sections disposed on each side of the center section. A concave area of each of the side sections is directed toward the center section. A second portion of the recess is disposed between the first portion of the recess and the front wall of the base. The second portion is defined by two rectangular first sides in position parallel to each other and two rectangular second sides perpendicular to the first sides, wherein the second sides have a length greater than a length of the first sides. A substantially parallelepiped third portion of the recess is disposed between the first portion and the second portion. The first portion is configured to securely retain a home video game controller, such as an X-box 360 controller or a Playstation game controller, therein. The first portion can also be configured to house other shapes and sizes of home video game controllers. The second portion of the recess is configured to securely retain at least one parallelepiped wireless port therein. The first and second portions provide protection against damage to a home video game controller and wireless port secured therein. A recessed slot configured to securely retain a memory card therein is disposed in the base.

A lid is hingedly attached to the base. An internal padding is continuously disposed between forward, rearward, left first and right second walls of the lid. Each of the upper side of the interior padding and an innermost side of internal padding is contiguous with the respective continuous top side and continuous lip. The interior and internal padding can be made of a foam plastic cushioned material or other material suitable to carry out the purpose of the present apparatus.

Steel corners are disposed on both the base and the lid to prevent wear and tear to the corners of the travel case. A latch mechanism lockingly engages and alternately releasingly engages the base and the lid. A handle is disposed on the base front wall. Footing members support the travel case in an upright position when the latch mechanism is locked.

Each of the height and width of the travel case is approximately 12 inches and the depth is approximately 6 inches.

Thus has been broadly outlined the more important features of the present game controller travel case so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
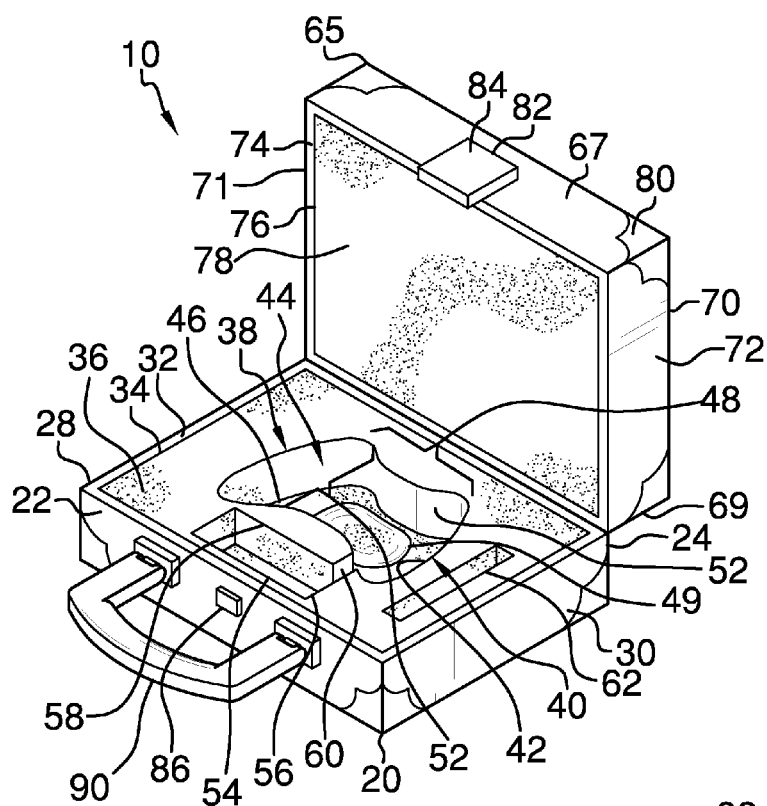
FIG. 1 is an isometric view in an open position.
Figure 2:
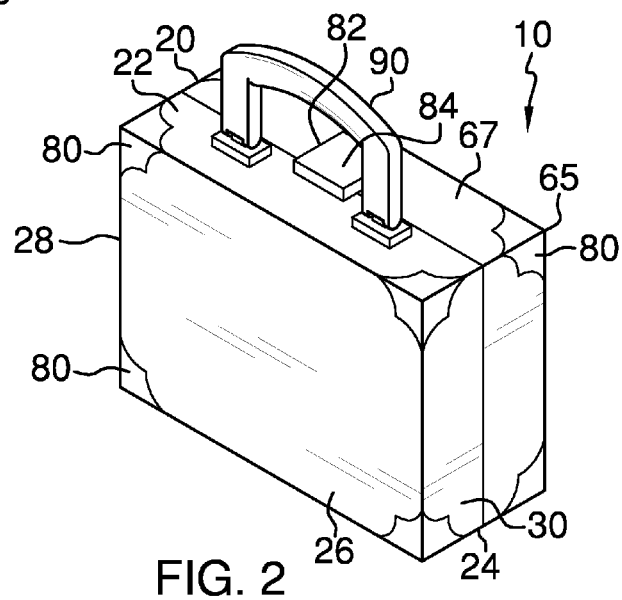
FIG. 2 is an isometric view in a closed position.
Figure 3:
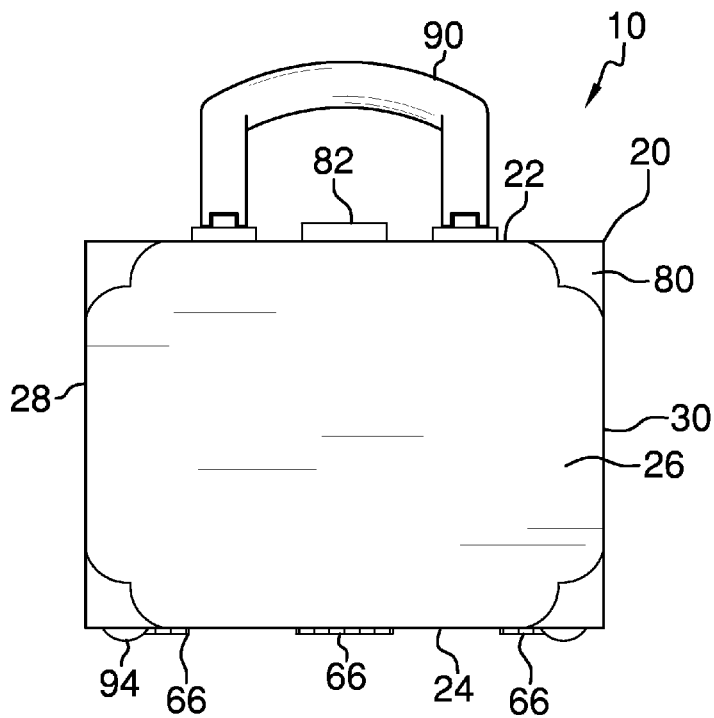
FIG. 3 is a front elevation view in the closed position.
Figure 4:
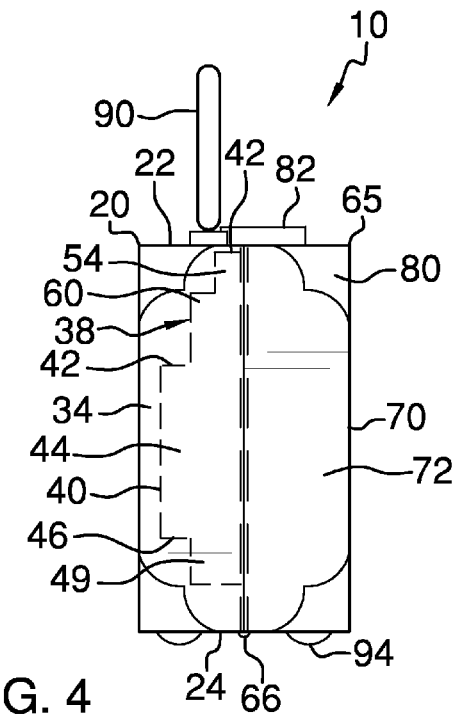
FIG. 4 is a right side elevation view in the closed position.
Figure 5:
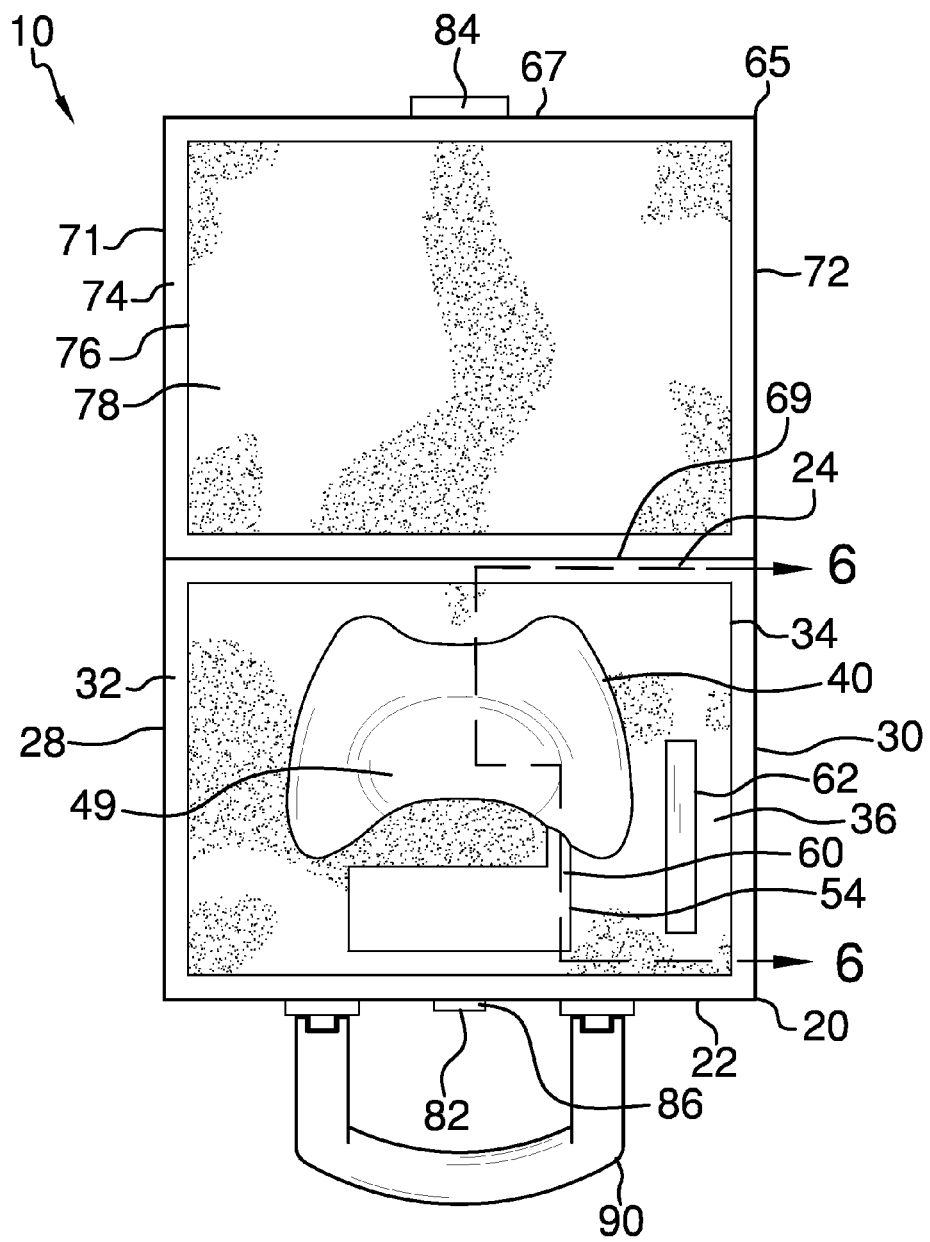
FIG. 5 is a top plan view in the open position.
Figure 6:
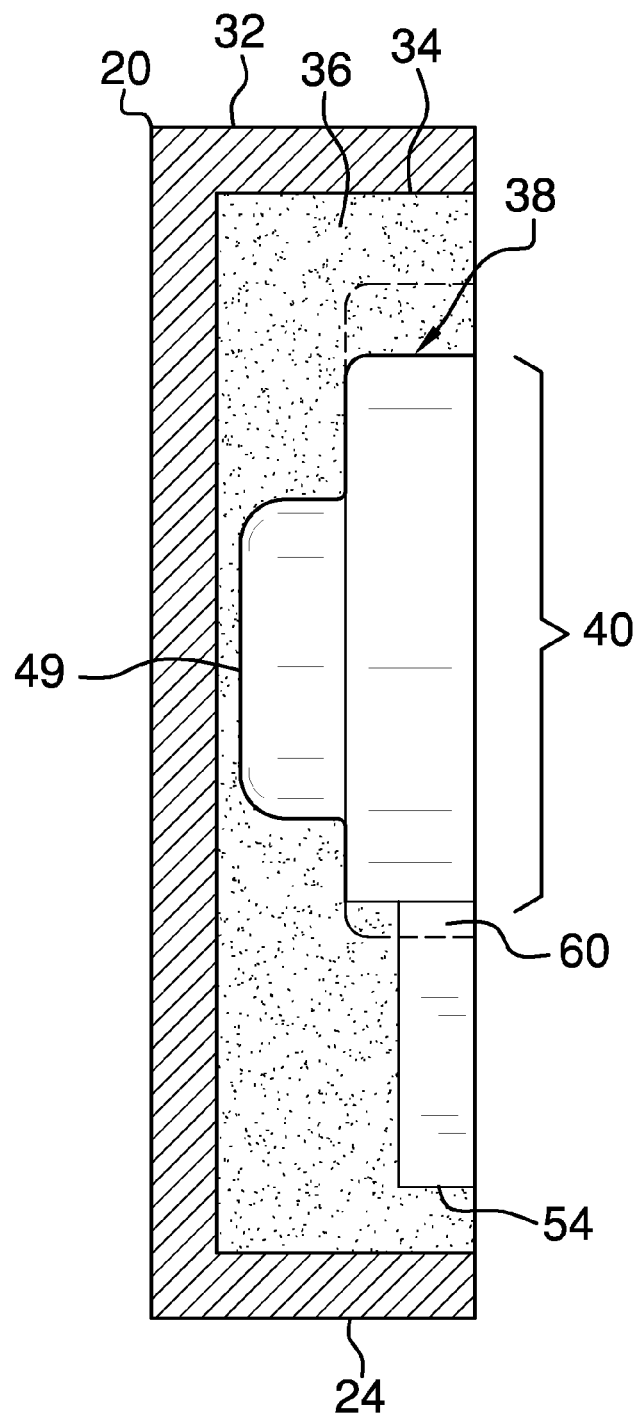
FIG. 6 is a cross-sectional view taken along line 6-6 of FIG. 1.

With reference now to the drawings, and in particular FIGS. 1 through 6 thereof, example of the instant game controller travel case employing the principles and concepts of the present game controller travel case and generally designated by the reference number 10 will be described.

Referring to FIGS. 1 through 6 a preferred embodiment of the present game controller travel case 10 is illustrated. The game controller travel case 10 is configured to store a home video game controller, including an Xbox 360 game controller and, alternatively, a Playstation 3 game controller, therein. The game controller travel case 10 includes a base 20. The base 20 has a front wall 22, a rear wall 24, a bottom side 26, a left wall 28, a right wall 30, and a continuous top side 32.

An interior padding 34 is continuously disposed between the front wall 22, the rear wall 24, the bottom side 26, the left wall 28, and the right wall 30. The interior padding 34 also has an upper side 36. A padded recess 38 is disposed within the interior padding 34 between the upper side 36 thereof and the bottom side 26 of the base 20. A first portion 40 of the recess 38 has an upper ledge 42 and a cavity 44 continuously disposed within the interior padding 34 between a lower wall 46 of the upper ledge 42 and the bottom side 26 of the base 20. The first portion 40 has a horizontally disposed biconcave center section 48 with mirror image substantially kidney-shaped side sections 50 disposed on each side of the center section 48. A concave area 52 of each of the side sections 50 is directed toward the center section 48. An oblate spheroid depression 49 is centrally disposed in the first portion 40 between the side sections 50. A second portion 54 of the recess 38 is disposed between the first portion 40 of the recess 38 and the front wall 22 of the base 20. The second portion 54 is defined by two rectangular first sides 56 in position parallel to each other and two rectangular second sides 58 perpendicular to the first sides 56, wherein the second sides 58 have a length greater than a length of the first sides 56.

A substantially parallelepiped third portion 60 of the recess 38 is disposed between the first portion 40 and the second portion 54. The first portion 40 is configured to securely retain a home video game controller therein. The second portion 54 of the recess 38 is configured to securely retain at least one parallelepiped wireless port therein. The first portion 40 as illustrated houses a game controller for X-box 360 and alternately, a Playstation game controller. However, the first portion 40 can be configured to house other shapes and sizes of home video game controllers. The first and second portions 40, 54 provide protection against damage to a home video game controller and wireless port secured therein.

A recessed slot 62 is disposed in the base 20. The slot 62 is configured to securely retain a memory card therein.

A lid 65 is hingedly attached to the base 20 via a plurality of hinges 66. The lid 65 has a forward wall 67, a rearward wall 69, an outer wall 70, a left first wall 71, and a right second wall 72 and a continuous lip 74. An internal padding 76 is continuously disposed between the forward wall 67, the rearward wall 69, the left first wall 71, and the right second wall 72. Each of the upper side 36 of the interior padding 34 and an innermost side 78 of internal padding 76 is contiguous with the respective continuous top side 32 and continuous lip 74.

A steel corner 80 is disposed between the each of the front wall 22 and each of the left wall 28 and the right wall 30 of the base 20, the rear wall 24 and each of the left wall 28 and the right wall 30 of the base 20, the forward wall 67 and each of the left first wall 71 and the right second wall 72 of the lid 65, and the rearward wall 69 and each of the left first wall 71 and the right second wall 72 of the lid 65. The steel corners 80 prevent wear and tear to the corners of the travel case.

A latch mechanism 82 is also provided. The latch mechanism 82 has a first portion 84 disposed on the lid 65 forward wall 67 and a second portion 86 disposed on the base 20 front wall 22. The first portion 84 lockingly engages and alternately releaseably engages the second portion 86. A handle 90 is disposed on the base 20 front wall 22.

A plurality of hemispherical footing members 94 is disposed on the base 20 rear wall 24 and on the lid 65 rearward wall 69. The footing members 94 are configured to support the base 20 and the lid 65 in an upright position on a level surface when the second portion 86 of the latch mechanism 82 on the base 20 and the first portion 84 of the latch mechanism 82 on the lid 65 are lockingly engaged.

Each of the height and width of the travel case 10 is approximately 12 inches and the depth is approximately 6 inches.

What is claimed is:

1. A game controller travel case consisting of:
   a base having a front wall, a rear wall, a bottom side, a left wall, a right wall, and a continuous top side;
   an interior padding continuously disposed between the front wall, the rear wall, the bottom side, the left wall, and the right wall;
   an upper side of the interior padding;
   a padded recess disposed within the interior padding between the upper side thereof and the bottom side of the base;
   a first portion of the recess having an upper ledge and a cavity continuously disposed within the interior padding between a lower wall of the upper ledge and the bottom side of the base, wherein the first portion has a horizontally disposed biconcave center section with mirror image substantially kidney-shaped side sections disposed on each side of the center section, wherein a concave area of each of the side sections is directed toward the center section;
   a second portion of the recess disposed between the first portion of the recess and the front wall of the base, wherein the second portion is defined by two rectangular first sides in position parallel to each other and two rectangular second sides perpendicular to the first sides, wherein the second sides have a length greater than a length of the first sides;
   a substantially parallelepiped third portion of the recess disposed between the first portion and the second portion;
   a lid having a forward wall, a rearward wall, an outer wall, a left first wall, and a right second wall and a continuous lip;
   an internal padding continuously disposed between the forward wall, the rearward wall, the left first wall, and the right second wall
   wherein each of the upper side of the interior padding and an innermost side of internal padding is contiguous with the respective continuous top side and continuous lip;
   a steel corner disposed continuously between the each of the front wall and each of the left wall and the right wall of the base, the rear wall and each of the left wall and the right wall of the base, the forward wall and each of the left first wall and the right second wall of the lid, and the rearward wall and each of the left first wall and the right second wall of the lid;
   a memory card shaped and sized slot disposed in the base, wherein the slot is configured to securely retain a memory card therein;
   wherein the first portion is configured to securely retain a home video game controller therein;
   wherein the second portion of the recess is configured to securely retain at least one parallelepiped wireless port therein;
   a latch mechanism having a first portion disposed on the lid forward wall and a second portion disposed on the base front wall, wherein the first portion lockingly engages and alternately releaseably engages the second portion;
   a handle disposed on the base front wall;
   a plurality of hemispherical footing members disposed on the base rear wall and on the lid rearward wall; and
   wherein the footing members are configured to support the base and the lid in an upright position on a level surface when the second portion of the latch mechanism on the base and the first portion of the latch mechanism on the lid are lockingly engaged.

* * * * *